Patented Nov. 13, 1951

2,574,996

UNITED STATES PATENT OFFICE 2,574,996

N-(ACETYLMERCAPTOACETYL)-N'-n-BUTYLUREA

Charles F. H. Allen and James A. Van Allan, Rochester, N. Y., assignors to Eastman Kodak Company, Rochester, N. Y., a corporation of New Jersey No Drawing. Application November 18, 1948, Serial No. 60,814

1 Claim. (Cl. 260—455)

This invention relates to a group of new compounds, namely: N-(acetylmercaptoacetyl) urea and its N'-substituted derivatives, in which the N'-substituent is a hydrocarbon group containing less than seven carbon atoms. N-(acetylmercaptoacetyl) urea, which may also be called N-(acetylthioglycolyl) urea, has the structural formula:

$$CH_3.CO.S.CH_2.CO.NH.CO.NH_2$$

Its N'-substituted derivatives which form part of our invention have the general formula:

$$CH_3.CO.S.CH_2.CO.NH.CO.NH.R$$

in which R is a hydrocarbon group containing less than seven carbon atoms, such, for instance, as methyl, ethyl, propyl, butyl, amyl, or phenyl.

By way of illustrating the method of preparing our novel compounds, we give the following example:

*N-(acetylmercaptoacetyl)-N'-n-butylurea.*— 5.8 g. of N-n-butylurea was dissolved in 20 g. of dry dioxane. 8 g. of quinoline was added; then 7.6 g. of acetylmercaptoacetyl chloride (acetylthioglycolyl chloride) was added, all at once. The reaction which took place was quite exothermic. The reaction mixture was allowed to stand for two hours at room temperature. It was then poured into water, and the oil which separated was taken up in benzene. The benzene solution was treated with Norit decolorizing carbon, filtered, and evaporated to dryness. The residue was recrystallized from ligroin. The yield was 7.1 g. (61% of theoretical) of pure white crystals of N-(acetylmercaptoacetyl)-N'-n-butylurea, M. P. 108° C.

The following compounds were prepared in the same manner, using corresponding amounts of urea, N-methylurea, N-tert.-amyl urea, and N-phenylurea in place of N-n-butylurea:

N-(acetylmercaptoacetyl) urea, M. P. 190–191° C.; N-(acetylmercaptoacetyl)-N'-methylurea, M. P. 205° C., N-(acetylmercaptoacetyl)-N'-tert.-amylurea, M. P. 44–46° C., and N-(acetylmercaptoacetyl)-N'-phenyl urea, M. P. 131° C.

Our novel compounds are useful as blue-black addition agents (anti-plumming agents) in photographic emulsions.

What we claim as our invention and desire to be secured by Letters Patent of the United States is:

N-(acetylmercaptoacetyl)-N'-n-butylurea.

CHARLES F. H. ALLEN.
JAMES A. VAN ALLAN.

REFERENCES CITED

The following references are of record in the file of this patent:

UNITED STATES PATENTS

| Number | Name | Date |
|---|---|---|
| 2,412,700 | Weissberger et al. | Dec. 17, 1946 |
| 2,418,497 | Burke | Apr. 8, 1947 |

OTHER REFERENCES

Beilstein "Handbuch der Org. Chemie," vol. 3 (2d Supplement, 1942), page 181.